(12) United States Patent
Egeland

(10) Patent No.: US 12,123,433 B2
(45) Date of Patent: Oct. 22, 2024

(54) SYSTEMS AND METHODS FOR PRODUCING COLD CNG FROM WELLHEAD GAS PRESSURE

(71) Applicant: CNX Resources Corporation, Canonsburg, PA (US)

(72) Inventor: Kevin Robert Egeland, Pittsburgh, PA (US)

(73) Assignee: CNX Resources Corporation, Canonsburg, PA (US)

( * ) Notice: Subject to any disclaimer, the term of this patent is extended or adjusted under 35 U.S.C. 154(b) by 20 days.

(21) Appl. No.: 17/940,791

(22) Filed: Sep. 8, 2022

(65) Prior Publication Data
US 2024/0084822 A1  Mar. 14, 2024

(51) Int. Cl.
*F15B 1/02* (2006.01)
*H02K 7/18* (2006.01)

(52) U.S. Cl.
CPC .............. *F15B 1/02* (2013.01); *H02K 7/1823* (2013.01); *Y02E 60/16* (2013.01); *Y02P 20/129* (2015.11); *Y02P 80/10* (2015.11)

(58) Field of Classification Search
CPC ......... F25J 1/0042; F25J 1/0032; F25J 1/0022
See application file for complete search history.

(56) References Cited

U.S. PATENT DOCUMENTS

| | | | |
|---|---|---|---|
| 2,309,075 A | 1/1943 | Hill | |
| 4,359,871 A | 11/1982 | Strass | |
| 6,085,546 A | 7/2000 | Johnston | |
| 6,269,656 B1 | 8/2001 | Johnston | |
| 7,452,390 B1 | 11/2008 | Al-Khalifa et al. | |
| 7,578,142 B2 | 8/2009 | Vasiljev et al. | |
| 2004/0136784 A1 | 7/2004 | Dahlem et al. | |
| 2010/0186445 A1* | 7/2010 | Minta | F25J 1/004 62/606 |

(Continued)

FOREIGN PATENT DOCUMENTS

| | | |
|---|---|---|
| CN | 110408445 A | 11/2019 |
| CN | 212584731 U | 2/2021 |

(Continued)

OTHER PUBLICATIONS

Notification of transmittal of the international search report and the written opinion of the international searching authority, or the declaration; Application No. PCT/US2023/031034, mailed Dec. 6, 2023, 12 pages.

*Primary Examiner* — Lionel Nouketcha

(57) ABSTRACT

Methods and compositions for processing a gas produced from an oil and gas well are provided. In some embodiments, the compositions include a wellbore penetrating at least a portion of a subterranean formation. The compositions further include one or more fluid flow paths in fluid communication with the wellbore, the one or more fluid flow paths having at least a first segment and a second segment. The compositions further include at least one heat exchanger. The compositions further include an expander coupled to a generator in fluid communication with the gas in the second segment. The gas in the first segment flows through the at least one heat exchanger wherein it is cooled to the point of forming CNG, and the gas in the second segment flows through the expander to generate electricity.

21 Claims, 5 Drawing Sheets

(56) References Cited

U.S. PATENT DOCUMENTS

| | | | |
|---|---|---|---|
| 2015/0344770 A1 | 12/2015 | Lewis | |
| 2017/0074583 A1* | 3/2017 | Tremblay | B01F 35/718051 |
| 2017/0248130 A1 | 8/2017 | Athirathnam et al. | |
| 2018/0002623 A1 | 1/2018 | Noekleby et al. | |
| 2018/0274347 A1 | 9/2018 | Ricotta | |
| 2020/0208910 A1* | 7/2020 | Park | F25J 1/004 |
| 2020/0386090 A1 | 12/2020 | Lourenco et al. | |
| 2021/0088273 A1* | 3/2021 | Harman, Jr. | F25J 1/0202 |

FOREIGN PATENT DOCUMENTS

| | | | |
|---|---|---|---|
| GB | 710256 A | 6/1954 |
| GB | 1140015 A | 1/1969 |
| WO | 2013092097 A2 | 6/2013 |

\* cited by examiner

SYSTEMS AND METHODS FOR PRODUCING COLD CNG FROM WELLHEAD GAS PRESSURE

TECHNICAL FIELD

The present disclosure relates to producing and storing energy via wellhead gas pressure, and more particularly, to using existing wellhead pressure to produce one or more of compressed natural gas ("CNG") and electricity.

BACKGROUND

Natural gas wells can generate immense pressure during early production, often far higher than the operating pressures of the pipelines into which they are produced. Moreover, certain shale formations can sustain these excessively high pressures for up to several years after a well is first turned in line. In a conventional early production scenario, the gas stream is: (1) throttled from wellhead pressure to pipeline pressure by a choke valve; and (2) heated before and/or after the choke valve to compensate for the Joule-Thomson effect. Heating is often necessary to avoid operational issues caused by low gas temperatures. Alternatively, all or part of the throttling step could be replaced by expansion through a turbine (or other type of gas expander), thereby extracting useful energy from the fluid stream as it undergoes its required pressure reduction. The term "geobaric" is used herein to describe this potential source of energy; for certain wells, especially those producing high gas flow rates at excessively high wellhead pressures for a long period of time, the amount of available geobaric energy may be significant. Geobaric energy is particularly attractive because of its (potentially) very low carbon intensity; in some cases, the only emissions associated with a geobaric energy-producing process would come from the high-pressure dehydrator upstream of the expander inlet.

However, geobaric energy faces a nettlesome thermodynamic hurdle. Given two alternative processes for the adiabatic pressure reduction of a gas stream, the first being isenthalpic (for example, and without limitation, throttling through a choke valve) and the second extracting a net positive amount of work from the gas (for example, and without limitation, expansion through a turbine, or some combination of expansion and throttling), two observations follow from the first law of thermodynamics: (1) the outlet temperature of the second process must be lower than that of the first process; and (2) the more work extracted by the second process, the greater the difference in outlet temperatures will be. Thus, if pressure reduction through a conventional choke valve results in problematically low outlet temperatures, pressure reduction through a geobaric expander may only exacerbate the problem. In fact, use of an expander may exacerbate the problem in proportion to how much geobaric energy is produced. The gas stream of a geobaric expander could be given additional heat to counteract these colder outlet temperatures, but doing so would be economically and environmentally unpalatable. Since a production line heater burns a portion of the gas stream as fuel, increasing its heat duty would require more salable product to be burned. Moreover, such embodiments may increase the heater's greenhouse gas emissions, thereby negating some or all of the environmental benefit associated with geobaric power. Ideally, the pressure-reduction step would need no external heat at all, reducing the need for salable product to be burned as fuel as well as the associated greenhouse gas emissions.

SUMMARY

The present disclosure relates to producing and storing energy via wellhead gas pressure, and more particularly, to using existing wellhead pressure to produce one or more of CNG and electricity. Though geobaric energy production is promising, several obvious uses have drawbacks. For instance, a geobaric expander could help reduce the power consumption of a wellpad LNG plant by both pre-cooling the feed stream and supplying supplemental power, but the geobaric expander by itself could not achieve a low enough temperature to liquefy gas. As another example, the cold expander outlet could be used to supply chiller duty to a separate process, but the transient and temporary nature of geobaric energy and the remoteness of many wellpads makes finding such synergy unlikely.

Certain embodiments of the present disclosure make use of the geobaric expander's low outlet temperature by taking advantage of a basic gas law: when gas is sealed in a rigid container, its absolute pressure will remain directly proportional to its absolute temperature, since the molar density is fixed. Thus, if cold gas is sealed in a rigid CNG container at a relatively low pressure, it may increase in pressure up to a customary level (for example, and without limitation, 3,600 pounds per square inch gage ("PSIG")) by gradually absorbing heat from its surroundings, provided that it has been loaded at a predetermined molar density (for example, and without limitation, 1.3 cubic feet per pound mole ("ft$^3$/lbmol")). In certain embodiments, such an isochoric compression process produces CNG without consuming any fuel or electricity (as is conventionally required). Such use of the expander's low outlet temperature may eliminate fuel burn for process heat, thereby allowing for the export of geobaric energy with minimal carbon emissions.

The present disclosure embodies several unique advantages. For example, certain embodiments may increase economic efficiency at a wellsite by capturing energy associated with pressure and/or by reducing or eliminating the need to burn salable gases on-site. Additionally, certain embodiments may decrease the wellsite's negative environmental effect by producing low-emission energy and/or reducing on-site emissions. These and other advantages of the systems and methods of the present disclosure may increase one or more of wellsite efficiency and carbon emission mitigation.

Some embodiments of the present disclosure are generally directed to a system for processing a gas produced from an oil and gas well. In some non-limiting embodiments, the system may include a wellbore penetrating at least a portion of a subterranean formation. In some non-limiting embodiments, the system may further include one or more fluid flow paths in fluid communication with the wellbore. The one or more fluid flow paths may include at least a first segment and a second segment. In some non-limiting embodiments, the system may further include at least one heat exchanger. In some non-limiting embodiments, the system may further include an expander coupled to a generator in fluid communication with the gas in the second segment of the one or more fluid flow paths. In some non-limiting embodiments, the gas in the first segment of the one or more fluid flow paths flows through the at least one heat exchanger and be cooled to the point of forming CNG. In some non-limiting embodiments, the gas in the second segment of the one or more fluid flow paths flows through the expander to generate electricity.

In some non-limiting embodiments, the gas in the second segment flows through and is heated by the heat exchanger after flowing through the expander.

In some non-limiting embodiments, the gas in the second segment is delivered to a pipeline after it is heated in the heat exchanger.

In some non-limiting embodiments, the gas in the second segment is stored as CNG.

In some non-limiting embodiments, the gas in the second segment is cooled via the at least one heat exchanger before flowing through the expander.

In some non-limiting embodiments, the one or more fluid flow paths further include a third segment, and the gas in the third segment is delivered from the wellbore and through the expander to generate electricity without being delivered through the at least one heat exchanger before being delivered through the expander.

In some non-limiting embodiments, the one or more fluid flow paths include a fourth segment, and the gas in the fourth segment is delivered from the wellbore and into the one or more containers without being delivered through the at least one heat exchanger before being delivered into the one or more containers.

In some non-limiting embodiments, the system further includes one or more valves coupled to the one or more fluid flow paths. In some non-limiting embodiments, a controller is in electronic communication with at least one of the one or more valves, and the controller is configured to actuate at least one of the one or more valves to direct one or more portions of the gas to the one or more fluid flow paths.

In some non-limiting embodiments, the system further includes at least one sensor coupled to one or more of the wellbore and the one or more fluid flow paths, and the at least one sensor is in electronic communication with the controller.

In some non-limiting embodiments, the at least one sensor includes one or more temperature sensors, one or more flow sensors, one or more molar density sensors, one or more molecular weight sensors, one or more pressure sensors, one or more fluid property sensors, or any combination thereof.

In some non-limiting embodiments, the controller automatically actuates at least one of the one or more valves based at least in part on a signal from the at least one sensor.

Some embodiments of the present disclosure are generally directed at a method for processing a gas produced from an oil and gas well. In some non-limiting embodiments, the method includes producing the gas from a wellbore. In some non-limiting embodiments, the method further includes delivering the gas to one or more fluid flow paths. In some non-limiting embodiments, the one or more fluid flow paths include a first segment and a second segment. In some non-limiting embodiments, the method further includes cooling the gas in the first segment via at least one heat exchanger to the point of forming CNG. In some non-limiting embodiments, the method further includes generating electricity by allowing the gas in the second segment to flow through an expander coupled to a generator. In some non-limiting embodiments, the wellbore penetrates at least a portion of a subterranean formation.

In some non-limiting embodiments, the method further includes heating the gas in the second segment via the at least one heat exchanger.

In some non-limiting embodiments, the method further includes delivering the gas in the second segment to a pipeline.

In some non-limiting embodiments, the method further includes storing the gas in the first segment as CNG.

In some non-limiting embodiments, the method further includes cooling the gas in the second segment via the at least one heat exchanger before allowing the gas in the second segment to flow through the expander.

In some non-limiting embodiments, the one or more fluid flow paths further include a third segment, and the gas in the third segment is delivered from the wellbore and through the expander to generate electricity without being delivered through the at least one heat exchanger before being delivered through the expander.

In some non-limiting embodiments, the method further includes controlling one or more valves via a controller to direct a flow of at least one portion of the gas.

In some non-limiting embodiments, the method further includes measuring, via at least one sensor, at least one quality of at least one portion of the gas.

In some non-limiting embodiments, the at least one quality includes one or more of temperature, flow rate, molar density, molecular weight, pressure, or other fluid properties.

In some non-limiting embodiments, the method further includes actuating, via the controller, at least one of the one or more valves at least in part based on a signal from the at least one sensor.

Some embodiments of the present disclosure are generally directed at a method for processing a gas produced from an oil and gas well. In some non-limiting embodiments, the method includes producing the gas from a wellbore. In some non-limiting embodiments, the method includes delivering the gas to one or more fluid flow paths. In some non-limiting embodiments, the one or more fluid flow paths include a first segment and a second segment. In some non-limiting embodiments, the method includes cooling the gas in the first segment via at least one heat exchanger. In some non-limiting embodiments, the method includes compressing the gas in the first segment via at least one compressor. In some non-limiting embodiments, the method includes storing the gas in the first segment as CNG. In some non-limiting embodiments, the method includes delivering the gas in the second segment to a pipeline. In some non-limiting embodiments, the wellbore penetrates at least a portion of a subterranean formation.

In some non-limiting embodiments, the method further includes heating the gas in the second segment via the at least one heat exchanger.

In some non-limiting embodiments, the gas in the first segment is cooled before being compressed via the at least one compressor.

In some non-limiting embodiments, the gas in the first segment is compressed via the at least one compressor before being cooled.

In some non-limiting embodiments, the one or more fluid flow paths further include a third segment, and the gas in the third segment is stored as CNG without having been cooled by the at least one heat exchanger.

In some non-limiting embodiments, the method further includes controlling one or more valves via a controller to direct a flow of at least one portion of the gas.

In some non-limiting embodiments, the method further includes measuring, via at least one sensor, at least one quality of at least one portion of the gas.

In some non-limiting embodiments, the at least one quality includes one or more of temperature, flow rate, molar density, molecular weight, pressure, or other fluid properties.

In some non-limiting embodiments, the method further includes actuating, via the controller, at least one of the one or more valves at least in part based on a signal from the at least one sensor.

These and other features and characteristics of the disclosed systems and methods for producing and storing energy via wellhead gas pressure will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular forms of "a", "an", and "the" include plural referents unless the context clearly dictates otherwise.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1A:
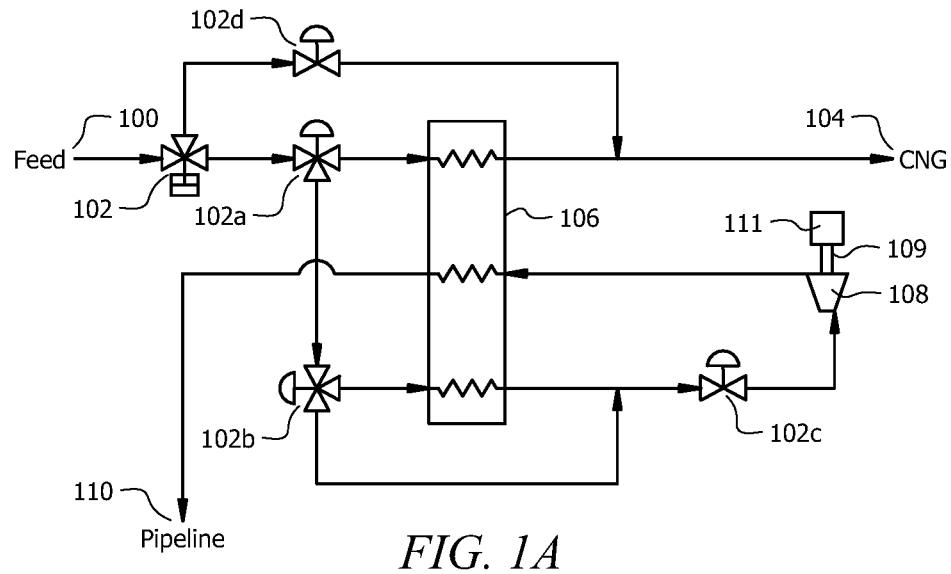
FIGS. 1A-1D are process flow diagrams for geobaric systems, according to one or more embodiments.

For purposes of the description hereinafter, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

As used herein, the term "coupled" should be understood to include any direct or indirect connection between two things, including, and without limitation, a physical connection (including, and without limitation, a wired or mechanical connection), a non-physical connection (including, and without limitation, a wireless connection), a fluid connection (including, and without limitation, a connection allowing for fluid communication), or any combination thereof. Furthermore, the words "comprising" (and any form of comprising, such as "comprise" and "comprises"), "having" (and any form of having, such as "has" and "have"), "including" (and any form of including, such as "includes" and "include") or "containing" (and any form of containing, such as "contains" and "contain") are to be understood as inclusive and open-ended and do not exclude additional, unrecited elements or method steps. Additionally, the terms "fluid" and "fluids" are to be understood as comprising one or more gases, one or more liquids, one or more solids carried by the flow of one or more gases and/or one or more liquids, and any combination thereof. As used herein, the term "geobaric" is to be understood as describing systems and methods that produce and/or capture energy from fluid stream pressure, wherein the pressure is produced at least in part by one or more geological phenomena; for example, and without limitation, the pressure from gas in a reservoir compressed by the earth may be used to produce geobaric energy. As used herein, the term "gas" is to be understood as comprising one or more gases.

As used herein, the term "at least one of" is synonymous with "one or more of." For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of." For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

Figure 1B:
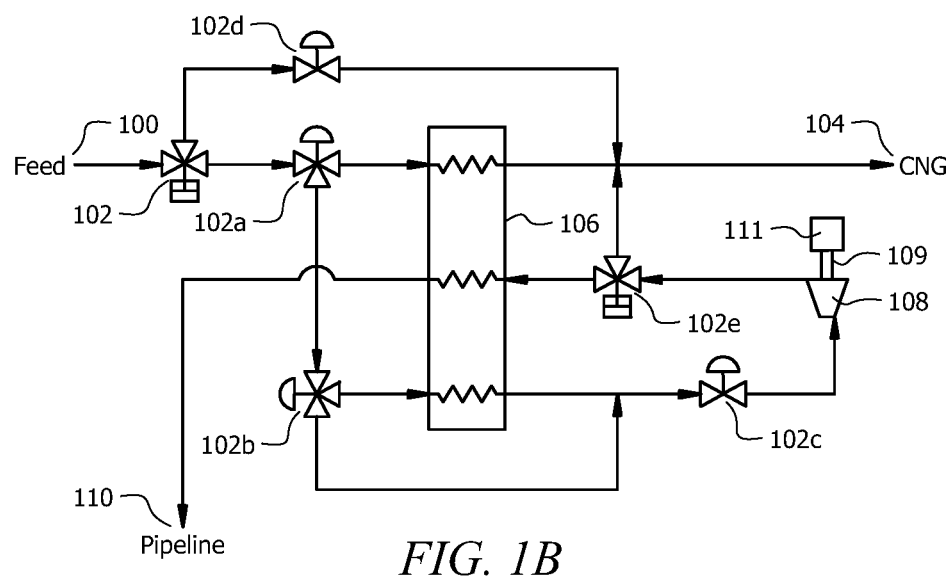
Figure 1C:
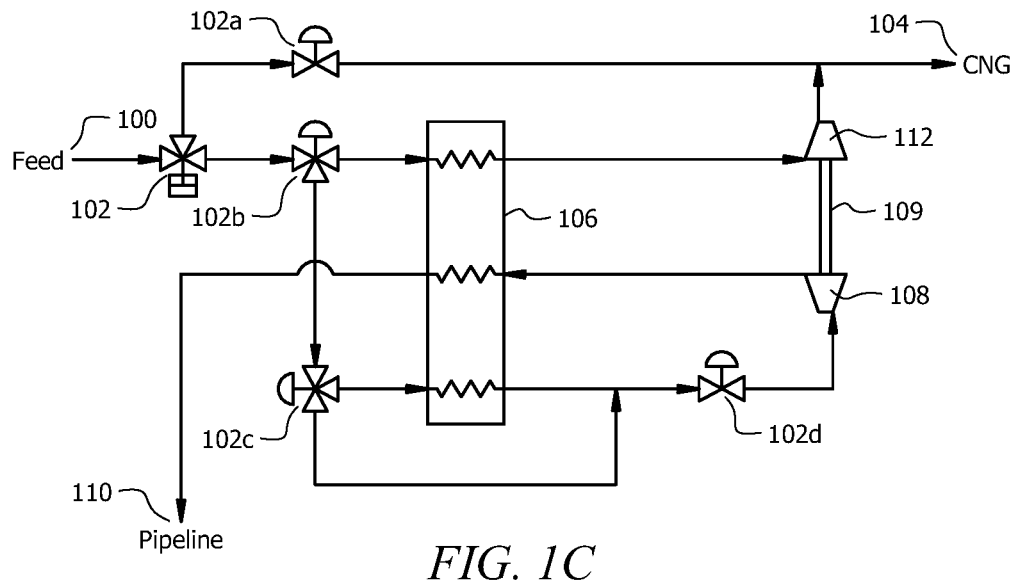
Figure 1D:
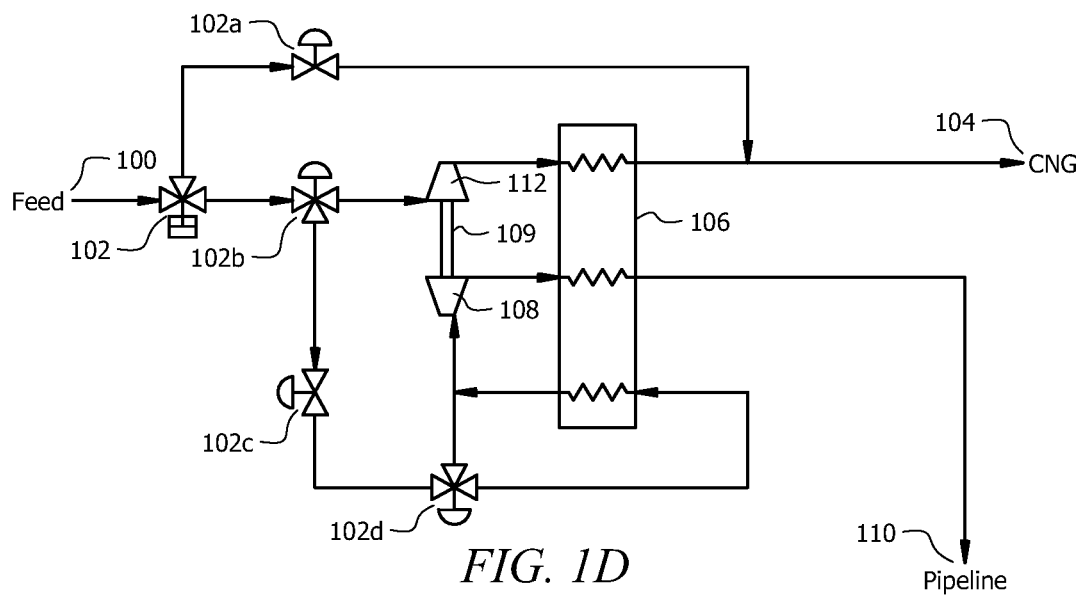

FIGS. 1A-1D are process flow diagrams for geobaric systems, according to one or more embodiments of the present disclosure. In each of FIGS. 1A-1D, gas from an oil and gas well may flow from a feed 100 to one or more valves 102. The valves 102 may control the flow of the gas within the system and may be controlled automatically, manually, or any combination thereof. Each of FIGS. 1A-1D include a heat exchanger 106, which may be used to transfer heat between portions of gas throughout the system. Furthermore, in each of FIGS. 1A-1D, at least a portion of the gas may be capable of being stored as CNG 104. Additionally, in each of FIGS. 1A-1D, at least a portion of the gas may be capable of flowing to a pipeline 110. FIGS. 1A-1D further include an expander 108. In FIGS. 1A and 1B, the expander 108 drives a generator 111 which may be used to produce electricity. In FIGS. 1C and 1D, the expander 108 drives a compressor 112, which may be used to compress the gas. In either case, the expander 108 supplies motive energy to another component (either the generator 111 or compressor 112) along a shaft 109. As used herein, the term "shaft" refers to any apparatus for transmitting motive energy from an expander 108 to another element. Certain embodiments may utilize one or more rotating shafts 109, one or more reciprocating shafts 109, or any combination thereof.

As used herein, the terms "valve" and "valves" describe a set of one or more instruments used to control the pressure and/or flow of one or more fluids by partly or wholly obstructing the fluid flow across one or more flow paths. For example, and without limitation, valves may be on/off valves, two-way valves, three-way valves, four-way valves, or valves associated with any other number of flow paths. Certain valves may direct all of the fluid flow across one or more flow paths while directing none of the fluid flow to one or more other flow paths. Certain other valves may direct portions of the fluid flow across one or more flow paths.

Certain valves may be operable to be adjusted in response to a stimulus (for example, and without limitation, an electrical signal and/or mechanical actuation) in order to control fluid flow. In certain embodiments, valve inputs may be Boolean (that is, inputs may have only two possible states, such as "on" and "off"). In certain other embodiments, valve inputs may have several possible states (for example, and without limitation, a controller may be used to direct percentages of fluid flow across one or more flow paths) or may modulate within a continuous range of states. It is within the ability of one skilled in the art and with the benefit of the present disclosure to select an appropriate combination of valves.

FIG. 1A is an exemplary embodiment wherein gas produced from an oil and gas well is processed into CNG, used to produce electricity, and sent to a pipeline 110. In certain embodiments, a first portion of the gas may flow through a first segment of one or more fluid flow paths. The first portion of the gas may flow from the feed 100 to a main valve 102, after which the gas may bypass the heat exchanger and may be stored as CNG 104. FIG. 1A shows an additional top valve 102d on the top portion of the system that bypasses the heat exchanger; however, certain embodiments may not include the top valve 102.

In certain embodiments, a second portion of the gas may flow through a second segment of the one or more fluid flow paths. The second portion of the gas may flow from the feed 100 to a main valve 102, after which the gas may flow to a first valve 102a. The second portion of the gas may then flow through the heat exchanger 106, wherein it may be cooled before being stored in a rigid container as CNG 104. The lowered temperature of the gas may compress the gas. Upon storage in a rigid container, the gas may heat. In certain embodiments, the gas may heat via ambient temperature. As the gas heats, pressure within the rigid container may increase.

In certain embodiments, a third portion of the gas may flow through a third segment of the one or more fluid flow paths. The third portion of the gas may flow from the feed 100 to a main valve 102, after which the gas may flow to a first valve 102a. The third portion of the gas may then flow to a second valve 102b, after which the third portion of the gas may be cooled by the heat exchanger 106. Upon cooling, the third portion of the gas may flow through the third valve 102c, which may allow the third portion of the gas to enter an expander 108 without exceeding the expander's maximum allowable operating pressure. The expander 108 may use the high pressure of the gas to produce electricity, further cooling the gas in the process. After exiting the expander 108, the third portion of the gas may be heated by the heat exchanger 106. Once the third portion of the gas has been heated to an appropriate temperature for pipeline use, the third portion of the gas may enter a pipeline 110.

In certain embodiments, a fourth portion of the gas may flow through a fourth segment of the one or more fluid flow paths. The fourth portion of the gas may flow from the feed 100 to a main valve 102, after which the gas may flow to a first valve 102a. The fourth portion of the gas may then flow to a second valve 102b, which may allow the fourth portion of the gas to bypass the heat exchanger 106. The fourth portion of the gas may then flow through a third valve 102c, which may allow the fourth portion of the gas to enter an expander 108 without exceeding the expander's maximum allowable operating pressure. The expander 108 may use the high pressure of the gas to produce electricity, cooling the gas in the process. After exiting the expander 108, the fourth portion of the gas may be heated by the heat exchanger 106. Once the fourth portion of the gas has been heated to an appropriate temperature for pipeline use, the fourth portion of the gas may enter a pipeline 110.

The above four portions of the gas and corresponding four segments of the flow paths of FIG. 1A are purely exemplary. Valves and corresponding pathways may be added and/or removed without departing from the scope of the present disclosure. Moreover, valves may be actuated so as to allow gas to flow through any number of pathways. In certain embodiments, gas may be allowed to flow through just one pathway; in other embodiments, gas may be allowed to flow through multiple (or all) pathways.

In certain embodiments, the temperature change in the heat exchanger 106 may be facilitated at least in part via separate portions of the gas. For example, in the above paragraphs, the second portion of the gas flows through what is shown as the top of the heat exchanger 106, the third portion of the gas initially flows through what is shown as the bottom of the heat exchanger 106, and the third and fourth portions of the gas ultimately flow through what is shown as the middle of the heat exchanger 106. In certain embodiments, portions of the gas may flow through different portions of the heat exchanger 106 at the same time. In doing so, one or more lower-temperature portions of the gas (such as the third and fourth portions of the gas after they have exited the expander 108) may be used to cool one or more higher-temperature portions of the gas (such as the second portion of the gas and the third portion of the gas before it has entered the expander 108). Similarly, one or more lower-temperature portions of the gas (for example, the third and fourth portions of the gas after they have exited the expander 108) may be heated via one or more higher-temperature portions of the gas. Thus, the temperature of gas in the system may be controlled via the actuation of valves 102 such that appropriate amounts of gas flow through certain sides of the heat exchanger 106 at appropriate times. The cooling effect of the expander 108 may be utilized to cool one or more portions of the gas directly and/or via the heat exchanger 106.

FIG. 1B is an exemplary embodiment suitable for high-pressure systems, wherein some of the gas flows from the expander 108 to be stored as CNG. FIG. 1B depicts the same four portions of the gas as FIG. 1A (though FIG. 1B depicts a fifth valve 102e located between the heat exchanger 106 and the expander 108). In addition, FIG. 1B depicts a fifth portion of the gas and a corresponding fifth segment of the fluid flow paths.

In certain embodiments, a fifth portion of the gas may flow through a fifth segment of the one or more fluid flow paths. The fifth portion of the gas may flow from the feed 100 to a main valve 102, after which the gas may flow to a first valve 102a. The fifth portion of the gas may then flow to a second valve 102b, after which the fifth portion of the gas may be cooled by the heat exchanger 106 or may bypass the heat exchanger 106. Upon cooling or bypassing the heat exchanger, the fifth portion of the gas may flow through a third valve 102c, which may allow the fifth portion of the gas to enter an expander 108. The expander may use the high pressure of the gas to produce electricity, further cooling the gas in the process. After flowing through the expander 108, the fifth portion of the gas may flow via a fifth valve 102e and be stored as CNG 104.

In certain embodiments having an expander 108 with an operating pressure exceeding 3,000 PSIG, the fifth portion of the gas may be expanded by the expander 108 and stored as CNG. In certain embodiments, pressure from the feed 100 must be sufficiently high so as to enable the fifth portion of the gas to remain at or above CNG molar density requirements after flowing through the expander 108. In certain embodiments, a molar density sensor may be utilized to determine when a portion of the gas has a sufficiently high molar density to both flow through an expander 108 and be stored as CNG. As used herein, the terms "molar density sensor" and "molar density sensors" are used to denote systems that determine a fluid's molar density. For example, and without limitation, certain molar density sensors may utilize one or more of pressure data, pressure sensor(s), temperature data, temperature sensor(s), fluid composition data, and fluid property sensor(s) to determine a fluid's molar density. In certain embodiments, one or more fluid property sensors may detect one or more fluid properties (for example, and without limitation, specific gravity) for use in a molar density calculation. In certain embodiments, one or more of a display and a controller may receive a signal from the molar density sensor indicating a pressure of a portion of the gas. In certain embodiments, one or more of a user and the controller may actuate the valves (manually and/or automatically) to control the flow of the gas based at least in part on the signal from the molar density sensor.

The above five portions of the gas and corresponding five segments of the fluid flow paths of FIG. 1B are purely exemplary. Valves and corresponding pathways may be added and/or removed without departing from the scope of the present disclosure. Moreover, one or more valves 102 may be actuated so as to allow gas to flow through any number of pathways. In certain embodiments, gas may be allowed to flow through just one pathway; in other embodiments, gas may be allowed to flow through multiple (or all) pathways.

FIG. 1C is an exemplary embodiment wherein gas produced from an oil and gas well is used to produce CNG and enter a pipeline. Where FIGS. 1A and 1B include a generator 111 (not shown in FIG. 1C), FIG. 1C instead includes a compressor 112.

In certain embodiments, a first portion of the gas may flow through a first segment of the one or more fluid flow paths. The first portion of the gas may flow from the feed 100 to a main valve 102, which may allow the first portion of the gas to bypass the heat exchanger 106. The first portion of the gas may then flow through a first valve 102*a* and stored as CNG 104.

In certain embodiments, a second portion of the gas may flow through a second segment of the one or more fluid flow paths. The second portion of the gas may flow from the feed 100 to a main valve 102, after which the second portion of the gas may flow to a second valve 102*b*. The second valve 102*b* may allow the second portion of the gas to flow to a heat exchanger 106. After being cooled by the heat exchanger 106, the second portion of the gas may flow to a compressor 112, which may compress the second portion of the gas. The second portion of the gas may then be stored as CNG 104.

In certain embodiments, a third portion of the gas may flow through a third segment of the one or more fluid flow paths. The third portion of the gas may flow from the feed 100 to a main valve 102, after which the third portion of the gas may flow to the second valve 102*b*. The second valve 102*b* may allow the third portion of the gas to flow to a third valve 102*c*. The third valve 102*c* may allow the third portion of the gas to flow through a heat exchanger 106, wherein the third portion of the gas may be cooled. The third portion of the gas may then flow through the fourth valve 102*d*, after which the third portion of the gas may enter an expander 108. The expander 108 may expand the third portion of the gas, after which the third portion of the gas may be heated by the heat exchanger 106. Finally, the third portion of the gas may enter a pipeline 110.

In certain embodiments, a fourth portion of the gas may flow through a fourth segment of the one or more fluid flow paths. The fourth portion of the gas may flow from the feed 100 to a main valve 102, after which the fourth portion of the gas may flow to the second valve 102*b*. The second valve 102*b* may allow the fourth portion of the gas to flow to a third valve 102*c*. The third valve 102*c* may allow the fourth portion of the gas to bypass the heat exchanger 106, after which the fourth portion of the gas may flow through a fourth valve 102*d*. The fourth valve 102*d* may allow the fourth portion of the gas to enter an expander 108 without exceeding the expander's maximum allowable operating pressure. The expander 108 may expand the fourth portion of the gas, after which the fourth portion of the gas may be heated by the heat exchanger 106. Finally, the fourth portion of the gas may enter a pipeline 110.

The above four portions of the gas and the corresponding four segments of the fluid flow paths of FIG. 1C are purely exemplary. Valves and corresponding pathways may be added and/or removed without departing from the scope of the present disclosure. Moreover, valves may be actuated so as to allow gas to flow through any number of pathways. In certain embodiments, gas may be allowed to flow through just one pathway; in other embodiments, gas may be allowed to flow through multiple (or all) pathways.

FIG. 1D is an exemplary embodiment similar to that of FIG. 1C; however, in FIG. 1D, one or more portions of the gas may flow through the compressor 112 before flowing through the heat exchanger 106. In certain embodiments, a first portion of the gas in FIG. 1D may flow through the same segment of the one or more fluid flow paths as the first portion of the gas in FIG. 1C (that is, the first segment).

In certain embodiments, a second portion of the gas may flow through a second segment of the one or more fluid flow paths. The second portion of the gas may flow from the feed 100 to a main valve 102. The main valve 102 may allow the second portion of the gas to flow to a second valve 102*b*. The second valve 102*b* may allow the second portion of the gas to flow to a compressor 112, which may compress the second portion of the gas. Next, the second portion of the gas may be cooled by the heat exchanger 106 and may be stored as CNG 104.

In certain embodiments, a third portion of the gas may flow through a third segment of the one or more fluid flow paths. The third portion of the gas may flow from the feed 100 to a main valve 102. The main valve 102 may allow the third portion of the gas to flow to a second valve 102*b*. The second valve 102*b* may allow the third portion of the gas to flow to a third valve 102*c*, which may allow the third portion of the gas to enter an expander 108 without exceeding the expander's maximum allowable operating pressure. After exiting third valve 102*c*, the gas may flow to a fourth valve 102*d*. The fourth valve 102*d* may allow the third portion of the gas to flow through the heat exchanger 106, wherein the third portion of the gas may be cooled. The third portion of the gas may then flow through the expander 108, wherein the third portion of the gas may be expanded. Finally, the third portion of the gas may be heated by the heat exchanger 106 and may enter a pipeline 110.

In certain embodiments, a fourth portion of the gas may flow through a fourth segment of the one or more fluid flow paths. The fourth portion of the gas may flow from the feed 100 to a main valve 102. The main valve 102 may allow the fourth portion of the gas to flow to a second valve 102*b*. The second valve 102*b* may allow the fourth portion of the gas to flow to a third valve 102c, which may allow the third portion of the gas to enter an expander 108 without exceeding the expander's maximum allowable operating pressure. After exiting third valve 102c, the gas may flow to a fourth valve 102d. The fourth valve 102d may allow the fourth portion of the gas to bypass the heat exchanger 106. The fourth portion of the gas may then flow through the expander 108, wherein the fourth portion of the gas may be expanded. Finally, the fourth portion of the gas may be heated by the heat exchanger 106 and may enter a pipeline 110.

The above four portions of the gas and corresponding four segments of the one or more fluid flow paths of FIG. 1D are purely exemplary. Valves and corresponding pathways may be added and/or removed without departing from the scope of the present disclosure. Moreover, valves may be actuated so as to allow gas to flow through any number of pathways. In certain embodiments, gas may be allowed to flow through just one pathway; in other embodiments, gas may be allowed to flow through multiple (or all) pathways.

It is to be understood that FIGS. 1A-1D are purely exemplary and non-limiting; other arrangements of geobaric systems fall within the scope of the present disclosure, and it is within the ability of one skilled in the art and with the benefit of the present disclosure to select an appropriate geobaric system arrangement. Elements of FIGS. 1A-1D may be added, removed, and/or otherwise combined in varying arrangements without departing from the scope of the present disclosure. Moreover, any number of valves 102 may be used in any arrangement without departing from the scope of the present disclosure.

In certain embodiments, electricity produced via an expander 108 may be used: (1) to increase or decrease the pressure of a fluid (for example, and without limitation, via a compressor 112); (2) to supply electricity to an electrical grid; (3) power an electrolyzer (for example, and without limitation, to produce hydrogen and oxygen gases via electrolysis of water); (4) to operate one or more pieces of wellsite equipment; (5) to increase or decrease the temperature of a fluid (for example, and without limitation, via a heat exchanger 106); (6) to accomplish any other useful application for electricity; or (7) any combination thereof.

Figure 2:
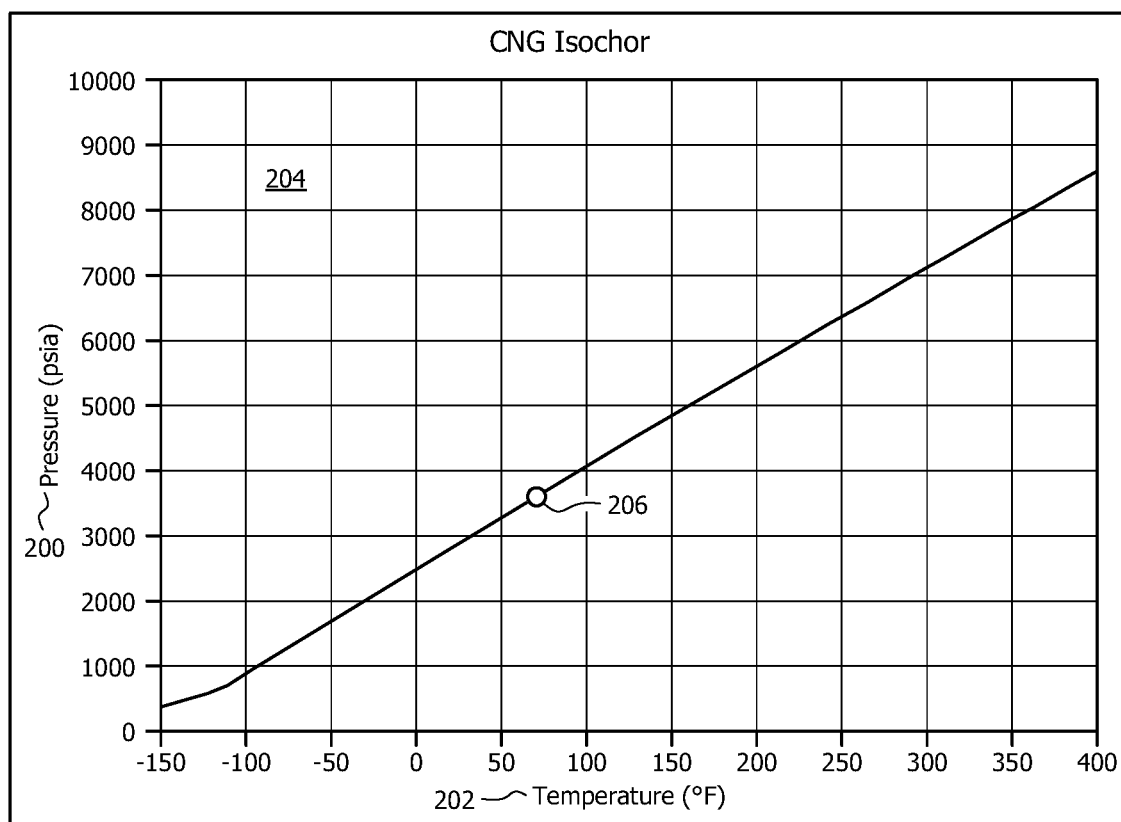
FIG. 2 is a graph depicting the relationship between pressure and temperature of a gas at a fixed volume, according to one or more embodiments.

FIG. 2 is a graph depicting the relationship between pressure and temperature of a gas at a fixed volume, according to one or more embodiments of the present disclosure. The Y-axis depicts the pressure of an example gas in pounds per square inch absolute ("PSIA") 200. The X-axis depicts the temperature of an example gas in degrees Fahrenheit 202. Data 204 is depicted, including the CNG isochor (that is, the curve showing the relationship between temperature and pressure of the gas when volume remains constant). A point 206 is depicted on the CNG isochor; the point 206 represents the pressure (3600 PSIA) and temperature (70 degrees Fahrenheit) that an example gas in an example rigid container may revert to over time, assuming an ambient temperature of 70 degrees Fahrenheit.

As used herein, the term "CNG" denotes natural gas having a molar density not less than that of an industry standard. For example, in certain embodiments, CNG may be on or to the left of the CNG isochor of FIG. 2; that is, CNG may have at least the same molar density that it would have at a pressure of 3,600 PSIA and temperature of 70° F. The specific pressure and temperature recited in this paragraph are non-limiting; different industry standards may necessitate different pressures and temperature.

If a gas having a lower-than-ambient temperature (for example, and without limitation, a gas that has been cooled by one or more of a heat exchanger and an expander) is sealed in a rigid container, the pressure of the gas will increase following an isochor like that of FIG. 2 as the temperature of the gas approaches ambient temperature. Accordingly, a gas may be stored at an elevated pressure by storing the gas in a rigid container at a lower pressure and lower-than-ambient temperature; though the molar density will remain constant, the pressure of the gas may increase as the temperature approaches ambient temperature. In certain embodiments, one or more of a user and an automated system having one or more of a processor and a memory may determine a target CNG pressure. One or more of the user and the automated system may then determine one or more of an entry pressure and a lower-than-ambient temperature corresponding to the isochor on which the target CNG pressure is equal to the ambient temperature. Accordingly, in certain embodiments, gas may be sealed in a rigid container at a pressure lower than that of ambient-air CNG, allowed to heat via ambient air, and automatically pressurized by the temperature change to an appropriate CNG pressure.

Figure 3:
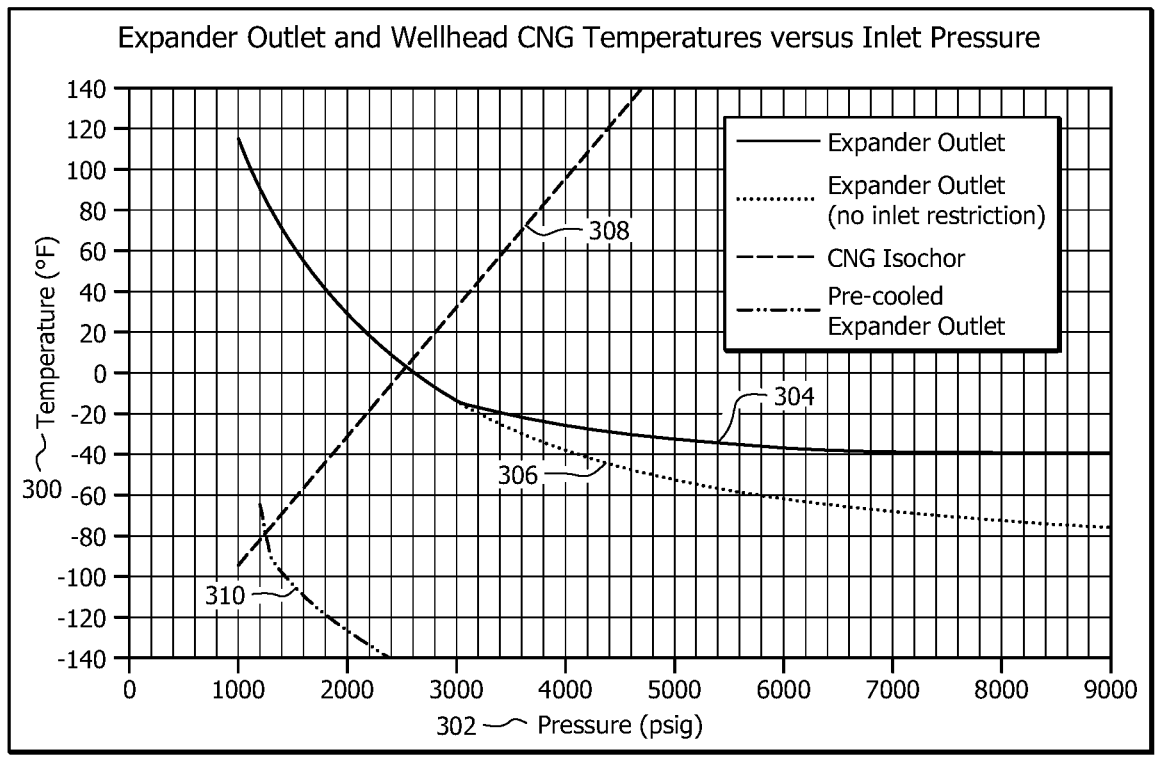
FIG. 3 is a graph depicting a comparison of the expander outlet temperature (as a function of the expander inlet pressure) to the CNG isochor, according to one or more embodiments.

FIG. 3 is a graph depicting a comparison of the expander outlet temperature (as a function of the expander inlet pressure) to the CNG isochor, according to one or more embodiments of the present disclosure. The Y-axis depicts the temperature of an example gas in degrees Fahrenheit 300. The X-axis depicts the pressure of an example gas in PSIG 302. The CNG isochor is depicted as dashed line 308. In certain embodiments, an expander may have a maximum inlet pressure. The non-pre-chilled expander outlet line 304 depicts the relationship between temperature and pressure of a gas assuming an example maximum inlet pressure of 3000 PSIG. The no-inlet-restriction expander outlet line 306 depicts the relationship between temperature and pressure of a gas assuming there is no maximum inlet pressure (and assuming the maximum inlet pressure does not exceed the bounds of the graph).

In certain embodiments, the relationship between the CNG isochor 308 and a gas's temperature and pressure may be used to determine whether to (1) convert the gas to CNG or (2) produce electricity using an expander and send the gas to a pipeline. Temperatures and pressures on or to the left of the CNG isochor 308 indicate that the gas may be stored as CNG without compressing and/or cooling the gas. Temperatures and pressures to the right of the CNG isochor 308 indicate that the gas may not be stored as CNG without compressing and/or cooling the gas.

Graphs like that of FIG. 3 may be utilized to determine how gas from a feed should be directed through segments of one or more fluid flow paths. In certain embodiments, an operator or an automatic controller may determine a composition of a gas. Using the composition of the gas, the operator or automatic controller may determine an appropriate CNG isochor 308, such as that of FIG. 3. Next, an operator or automatic controller may determine the feed temperature and feed pressure (collectively, "Feed Conditions") of the gas. If the point on the graph corresponding to the gas's feed conditions ("Feed Condition Point" or "Feed Condition Points") is not to the left of the CNG isochor 308, the operator or automatic controller may allow all of the gas to be stored as CNG 104.

If the operator or automatic controller determines that the Feed Condition Point is to the left of the CNG isochor 308, the operator or automatic controller may determine whether the non-pre-chilled expander outlet line 304 is below the CNG isochor 308 at the gas's feed pressure. If it is, the operator or automatic controller may allow a first portion of the gas to be chilled by a heat exchanger 106 before being stored as CNG 104, provided that the temperature difference between the CNG isochor 308 and non-pre-chilled expander outlet line 304 at the gas's feed pressure is not less than the approach temperature that can be achieved by a heat exchanger 106. The operator may also allow a second portion of the gas to flow through an expander 108, generate electricity, and flow to a pipeline 110 without being chilled by a heat exchanger 106.

If the operator or automatic controller determines that the non-pre-chilled expander outlet line 304 is not below the CNG isochor 308 at the gas's feed pressure (and if the temperature difference between the CNG isochor 308 and non-pre-chilled expander outlet line 304 at the gas's feed pressure is not less than the approach temperature that can be achieved by a heat exchanger 106), the operator or automatic controller may determine whether the pre-cooled expander outlet line 310 is below the CNG isochor 308 at the gas's feed pressure. If it is, the operator or automatic controller may allow the first portion and the second portion of the gas to follow the same paths as described above; furthermore, the operator or automatic controller may allow a third portion of the gas to be chilled by a heat exchanger 106, flow through an expander 108, generate electricity, and flow to a pipeline 110.

If the operator or automatic controller determines that the pre-cooled expander outlet line 310 is above the CNG isochor 308 at the gas's feed pressure (and if the temperature difference between the CNG isochor 308 and non-pre-chilled expander outlet line 304 at the gas's feed pressure is not less than the approach temperature that can be achieved by a heat exchanger 106), the operator or automatic controller may determine that CNG production is either economically or technically infeasible at the current Feed Condition Point. Accordingly, the operator or automatic controller may allow all of the gas to flow through an expander 108, generate electricity, and flow to a pipeline 110, provided that the non-pre-chilled expander outlet line 308 is above a minimum acceptable temperature for gas entering the pipeline at the gas's feed pressure.

The above sequence of steps is purely exemplary and non-limiting; steps may be added, removed, and/or performed in a different sequence without departing from the scope of the present disclosure. Moreover, it is within the ability of one skilled in the art and with the benefit of the present disclosure to select an appropriate sequence of steps. At certain Feed Condition Points, gas may be suitable for both storage as CNG and electricity production via expansion. At such Feed Condition Points, operators or automatic controllers may choose to (1) allow all of the gas to be stored; (2) allow all of the gas to generate electricity and flow to a pipeline; or (3) allow a portion of the gas to be stored and a portion of the gas to generate electricity and flow to a pipeline. At certain high feed pressures, a single portion of gas may be suitable to flow through an expander 108, generate electricity, and be stored as CNG (as depicted by the fluid flow path traveling upward from valve 102e of FIG. 1B).

In certain embodiments, the pressure of a gas may decrease after the gas flows through an expander 108. In certain embodiments in which the feed pressure is sufficiently high, a gas may be used to generate electricity via an expander 108 and may subsequently be stored as CNG. One or more molar density sensors may be used to determine whether the gas is suitable for CNG storage, electricity production, or both.

Figure 4:
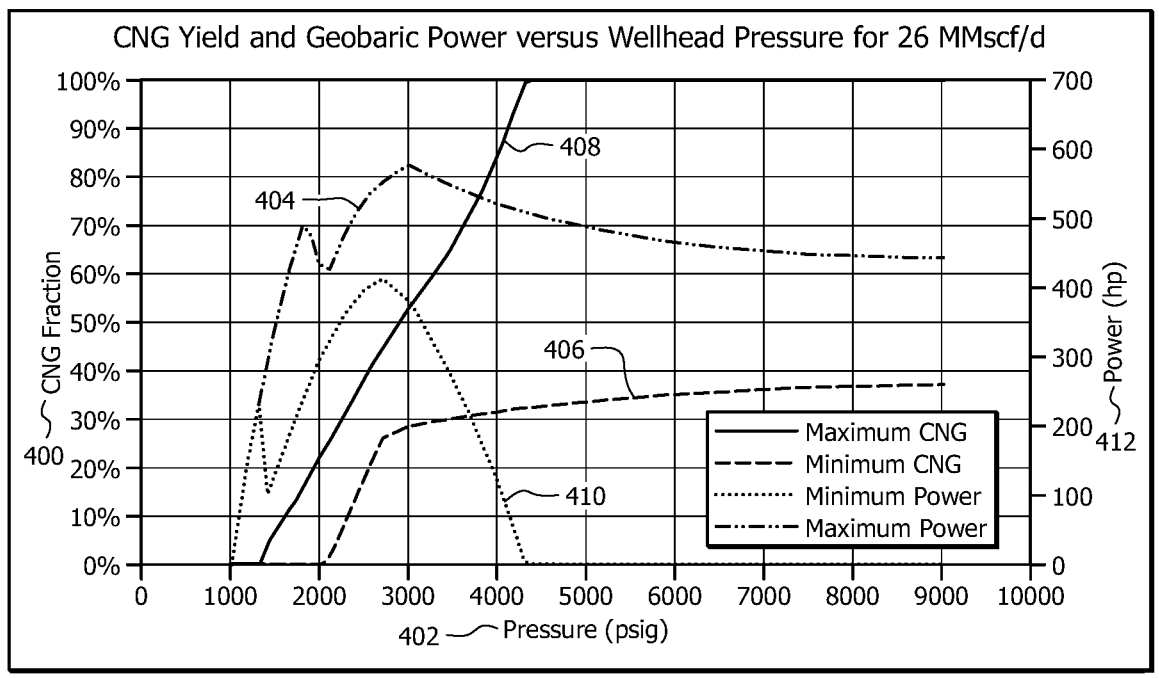
FIG. 4 is a graph depicting the tradeoff between CNG storage and electricity production in an example geobaric system, according to one or more embodiments.

FIG. 4 is a graph depicting the tradeoff between CNG storage and electricity production in an example geobaric system, according to one or more embodiments of the present disclosure. The Y-axis depicts the CNG fraction 400 as a percentage; the Y-axis further depicts an amount of power produced in horsepower ("HP") 412. The X-axis depicts the pressure of an example gas in PSIG 402.

In certain embodiments, operators of a geobaric system may optimize CNG production, electrical power production, or any combination thereof. As a higher percentage of gas is recovered as CNG, a lower amount of electricity may be produced (assuming additional energy is not added to or removed from the system). Conversely, as a higher amount of electricity is produced, a lower percentage of gas is recovered as CNG (again, assuming additional energy is not added to or removed from the system). In certain embodiments, operators may opt to produce maximum CNG (corresponding to line 408) and minimum power (corresponding to line 410).

In certain other embodiments, operators may opt to produce minimum CNG (corresponding to line 406) and maximum power (corresponding to line 404). The CNG fraction of minimum CNG line 406 and maximum CNG line 408 may be read using the left Y-axis 400. Similarly, the electrical power of minimum power line 410 and maximum power line 404 may be read using the right Y-axis 412.

FIG. 4 is purely exemplary and non-limiting. In certain embodiments, a system may more efficiently or less efficiently produce one or more of electrical power 412 and CNG 400. In certain embodiments, an operator may select a maximum CNG/minimum power output or a minimum CNG/maximum power output. In certain other embodiments, an operator may select an output between the two aforementioned extremes.

Figure 5:
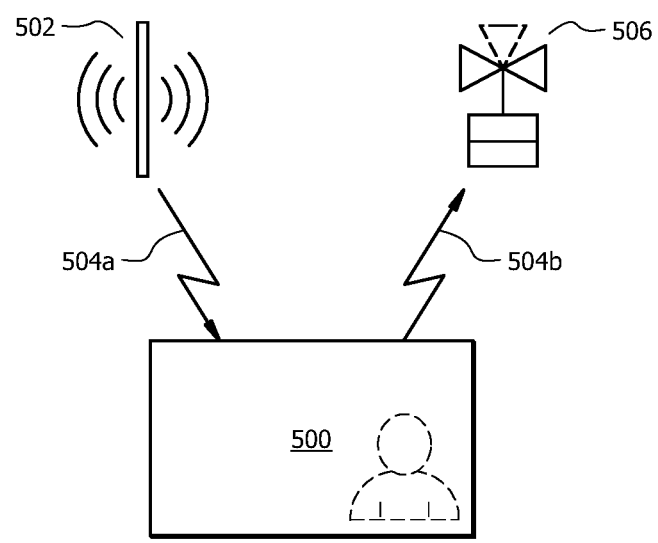
FIG. 5 is a block diagram depicting signals being transmitted between a sensor, controller, and valve, according to one or more embodiments.

FIG. 5 is a block diagram depicting signals being transmitted between a sensor, controller, and valve, according to one or more embodiments of the present disclosure. In certain embodiments, one or more sensors 502 may transmit a first signal 504a to a controller 500. The controller 500 may transmit a second signal 504b to one or more valves 506.

In certain embodiments, the one or more sensors 502 may include one or more temperature sensors (including, and without limitation, one or more gas temperature sensors and/or one or more ambient temperature sensors), one or more flow sensors, one or more molar density sensors, one or more molecular weight sensors, one or more fluid property sensors, one or more pressure sensors, any other appropriate sensors, or any combination thereof. The one or more sensors 502 may be used to detect a quality of a gas and/or a quality of an environment. The one or more sensors 502 may send one or more first signals 504a to one or more of a display (not shown) and a controller 500. One or more of a user and a controller 500 may actuate the valves 506 (manually and/or automatically) to control the flow of a gas. In certain embodiments, a controller 500 may send one or more second signals 504b to one or more valves 506 to actuate the valves 506 and control the flow of a gas. In certain embodiments, the controller may operate automatically; in certain other embodiments, the controller may be operated by a user. In some embodiments, a user may utilize information displayed on a display (not shown) to manually actuate the valves 506 to control the flow of the gas. In certain embodiments, feed pressure from an oil and gas well may decrease over time, and gas within the system may be controlled accordingly.

Though FIG. 5 depicts a single sensor 502, single controller 500, single valve 506, first signal 504a, and second signal 504b, it is to be understood that any number, type, and combination of sensors 502, controllers 500, valves 506, and signals may be used without departing form the scope of the present disclosure. Moreover, it is within the ability of one skilled in the art to select an appropriate arrangement of sensors 502, controllers 500, and valves 506.

Certain embodiments of the present disclosure may include one or more heat exchangers. The one or more heat exchangers may be any combination of one or more appropriate heat exchangers, including double tube heat exchanger(s), shell-and-tube heat exchanger(s), tube-in-tube heat exchanger(s), plate heat exchanger(s), any other appropriate heat exchanger(s), and any combination thereof. Though FIGS. 1A-D each depict a single heat exchanger, any number of heat exchangers may be used without departing from the scope of the present invention.

Certain embodiments of the present disclosure may include one or more compressors 112. The one or more compressors 112 may be any combination of one or more appropriate compressors 112, including positive-displacement compressor(s) (for example, and without limitation, reciprocating compressor(s) and/or rotary screw compressor(s)), dynamic compressor(s) (for example, and without limitation, centrifugal compressor(s) and/or axial compressor(s)), and any combination thereof.

Certain embodiments of the present disclosure may include one or more expanders 108. The one or more expanders 108 may be any combination of one or more appropriate expanders 108, including dynamic expander(s) (for example, and without limitation, turboexpander(s)), positive displacement expander(s) (for example, and without limitation, reciprocating expander(s) and/or rotary screw expander(s)), and any combination thereof.

Certain embodiments of the present disclosure may include one or more valves. The one or more valves may be any combination of one or more appropriate valves, including one or more ball valves, one or more globe valves, one or more check valves, one or more needle valves, one or more solenoid valves, one or more plug valves, one or more butterfly valves, one or more other appropriate valves, or any combination thereof. The valves may be actuated by any appropriate method of actuation; for example, and without limitation, valves may be actuated manually, hydraulically, pneumatically, electrically, or any combination thereof.

While various embodiments of systems and methods for producing and storing energy via wellhead gas pressure were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

What is claimed is:

1. A system for processing a gas produced from an oil and gas well, the system comprising:
   a wellbore penetrating at least a portion of a subterranean formation;
   two or more fluid flow paths in fluid communication with the wellbore, at least one of the two or more fluid flow paths comprising at least a first segment and a second segment;
   at least one heat exchanger, wherein the two or more fluid flow paths are split into the said two or more fluid flow paths upstream of the at least one heat exchanger; and
   an expander in fluid communication with the gas in the second segment of at least one of the two or more fluid flow paths, wherein the expander is coupled to a generator;
   wherein the gas in the first segment of at least one of the two or more fluid flow paths flows through the at least one heat exchanger wherein it is cooled to the point of forming CNG; and
   wherein the gas in the second segment of at least one of the two or more fluid flow paths flows through the expander to generate electricity.

2. The system of claim 1, wherein the gas in the second segment flows through and is heated by the heat exchanger after flowing through the expander.

3. The system of claim 2, wherein the gas in the second segment is delivered to a pipeline after it is heated in the heat exchanger.

4. The system of claim 1, wherein the gas in the second segment is stored as CNG.

5. The system of claim 1, wherein the gas in the second segment is cooled via the at least one heat exchanger before flowing through the expander.

6. The system of claim 1, wherein at least one of the two or more fluid flow paths further comprises a third segment, and wherein the gas in the third segment is delivered from the wellbore and through the expander to generate electricity without being delivered through the at least one heat exchanger before being delivered through the expander.

7. The system of claim 1, wherein at least one of the two or more fluid flow paths further comprises an additional segment, and wherein the gas in the fourth segment is delivered from the wellbore and into one or more containers without being delivered through the at least one heat exchanger before being delivered into the one or more containers.

8. The system of claim 1, further comprising:
   one or more valves coupled to the two or more fluid flow paths; and
   a controller in electronic communication with at least one of the one or more valves,
   wherein the controller is configured to actuate at least one of the one or more valves to direct one or more portions of the gas to the two or more fluid flow paths.

9. The system of claim 8, further comprising at least one sensor coupled to one or more of the wellbore and the two or more fluid flow paths, wherein the at least one sensor is in electronic communication with the controller.

10. The system of claim 9, wherein the at least one sensor comprises one or more temperature sensors, one or more flow sensors, one or more molar density sensors, one or more molecular weight sensors, one or more pressure sensors, one or more fluid property sensors, or any combination thereof.

11. The system of claim 9, wherein the controller automatically actuates at least one of the one or more valves based at least in part on a signal from the at least one sensor.

12. A method for processing a gas produced from an oil and gas well, the method comprising:
   producing the gas from a wellbore;
   delivering the gas to two or more fluid flow paths, at least one of the two or more fluid flow paths comprising a first segment and a second segment;

cooling the gas in the first segment of at least one of the two or more fluid flow paths via at least one heat exchanger to the point of forming CNG; and generating electricity by allowing the gas in the second segment of at least one of the two or more fluid flow paths to flow through an expander coupled to a generator, wherein the wellbore penetrates at least a portion of a subterranean formation; and wherein the gas is delivered to the two or more fluid flow paths upstream of the at least one heat exchanger.

13. The method of claim 12, further comprising heating the gas in the second segment via the at least one heat exchanger.

14. The method of claim 13, further comprising delivering the gas in the second segment to a pipeline.

15. The method of claim 12, further comprising storing the gas in the first segment as CNG.

16. The method of claim 12, further comprising cooling the gas in the second segment via the at least one heat exchanger before allowing the gas in the second segment to flow through the expander.

17. The method of claim 12, wherein at least one of the two or more fluid flow paths further comprises a third segment, and wherein the gas in the third segment is delivered from the wellbore and through the expander to generate electricity without being delivered through the at least one heat exchanger before being delivered through the expander.

18. The method of claim 12, further comprising controlling one or more valves via a controller to direct a flow of at least one portion of the gas.

19. The method of claim 18, further comprising measuring, via at least one sensor, at least one quality of at least one portion of the gas.

20. The method of claim 19, wherein the at least one quality comprises one or more of temperature, flow rate, molar density, molecular weight, pressure, or other fluid properties.

21. The method of claim 19, further comprising actuating, via the controller, at least one of the one or more valves at least in part based on a signal from the at least one sensor.

* * * * *